Nov. 14, 1939.      H. P. KUEHNI      2,180,153
CATHODE RAY OSCILLOGRAPH CONTROL
Filed Dec. 30, 1938
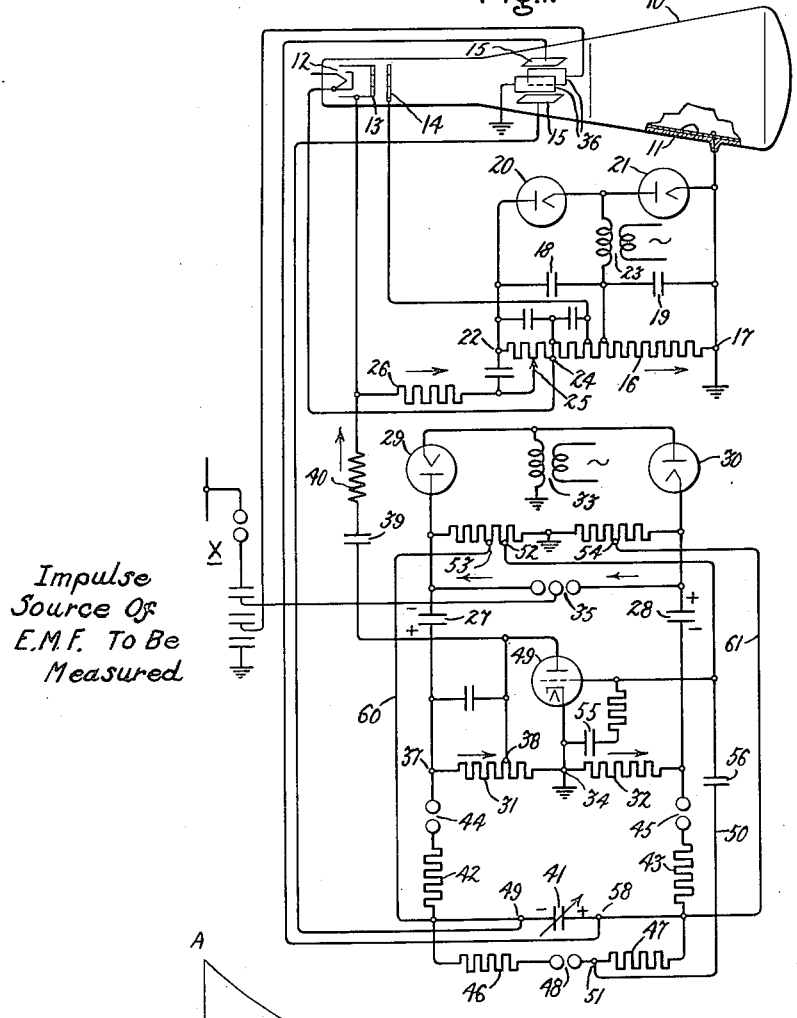
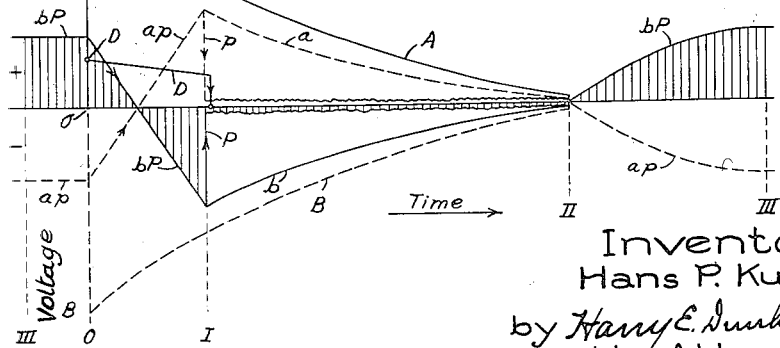
Inventor:
Hans P. Kuehni,
by Harry E. Dunham
His Attorney.

Patented Nov. 14, 1939

2,180,153

UNITED STATES PATENT OFFICE 2,180,153

CATHODE RAY OSCILLOGRAPH CONTROL

Hans P. Kuehni, Schenectady, N. Y., assignor to General Electric Company, a corporation of New York Application December 30, 1938, Serial No. 248,501

7 Claims. (Cl. 171—95)

My invention relates to an automatic control for cathode ray oscillographs and in particular to the automatic ignition and shutting off of the cathode ray beam and control of the sweep voltage such that the tube will be ignited only during the change in sweep plate voltage used for obtaining the time axis.

The features of my invention which are believed to be novel and patentable will be pointed out in the claims appended hereto. For a better understanding of my invention, reference is made in the following description to the accompanying drawing in which Fig. 1 represents my automatic control circuit and apparatus and its application to a cathode ray oscillograph tube and in Fig. 2 are time voltage curves to be referred to in the detail explanation of my invention.

Referring to Fig. 1, 10 represents a cathode ray oscillograph tube having an anode 11, a cathode 12, a control grid 13, accelerating electrode 14 and sweep plates 15. This tube will generally be of the permanently sealed high vacuum type and will usually have a fluorescent screen at its large end. Just below the tube in Fig. 1 is apparatus for providing the high D. C. voltage necessary for cathode excitation and may consist of a potentiometer resistance 16 grounded at 17 and having condensers 18 and 19 connected across its two halves. Rectifier tubes 20 and 21 are provided for charging the condensers and are connected to make the non-grounded point 22 of the resistance negative. A transformer 23 having its secondary connected from a point between tubes 20 and 21 and the mid-tap of the resistance and having its primary connected to a suitable A. C. source supplies the energy for this apparatus. The D. C. voltage between the anode 11, which is connected to the ground or positive end of the resistance, and the cathode 12 connected to the negative point 24 of the resistance may be of the order of 15,000 volts. The control grid 13 of the tube is connected to a tap 25 adjustable along the resistance and when at the point represented, produces a bias on 13 negative with respect to cathode 12 which normally prevents ignition of the cathode ray tube. It will be evident that manual control of the tube ignition may be had by moving tap 25 along the resistance to the right to remove the negative grid bias. Automatic means are provided for temporarily removing the grid bias by sending a direct current impulse through the resistance 26 contained in the grid exciting circuit in the direction indicated by the arrow.

Such impulse, as well as the sweep voltage for the cathode ray tube, is obtained from the automatic control apparatus represented in the lower part of the Fig. 1. This control apparatus includes a pair of condensers 27 and 28 connected in series in a charging circuit containing rectifying tubes 29 and 30, resistances 31 and 32 and an energy supply transformer 33 having its secondary connected between the rectifying tubes and ground. For convenience in distinguishing condensers 27 and 28 from other condensers to be referred to they may be termed supply condensers. The point 34 of the circuit between resistances 31 and 32 is also grounded. The tubes are so connected as to charge the supply condensers in the directions indicated by the polarity marks thereon, i. e., the lower terminal of condenser 27 has a positive and the lower terminal of condenser 28 has a negative charge.

Between tubes 29 and 30 and the condensers 27 and 28 a three point gap 35 is connected across the charging circuit and serves as a discharge circuit for the charge accumulated on the condensers when a signal voltage is applied to the middle point of the gap.

It will be understood that an impulse either positive or negative will be applied to the middle point of gap 35 to cause a discharge of this gap in the automatic control of the apparatus when the cathode ray tube is to be ignited to record some impulse phenomenon voltage applied between its deflection plates represented at 36, and the mid-point of the gap will be suitably tied to the impulse phenomenon circuit such as indicated at X to bring this about. Thus the apparatus includes a direct current impulse generator which discharges through resistance 31—32 in response to the phenomenon to be recorded by the oscillograph.

When the gap 35 breaks down to discharge condensers 27 and 28, a current impulse flows in the discharge circuit across gap 35 and resistances 31 and 32 in the direction of the arrows. The time constant of this discharge circuit may be of the order of 50,000 micro-seconds. When a discharge occurs in the circuit, point 37 of the resistance instantly rises to a voltage of the order of 7½ kilovolts, and point 38 to a somewhat lower voltage which is positive with respect to ground. Point 38 is connected to the control grid side of resistance 26 in the grid control circuit of the tube 10 through a circuit containing suitable impedance elements 39 and 40, and as a result, the discharge across gap 35 causes a direct current impulse to flow through resistance 26 in a direction shown by the arrow to supplied by rectifier tubes 29 and 30. The middle point of this potentiometer is grounded. Hence, prior to the break down of gaps 44 and 45, the sweep condenser is charged from the negative potential point 53 and the positive potential point 54 and hence has an initial charge on it of the polarity indicated in Fig. 1. The purpose of this initial charge is to produce a corresponding voltage on sweep plates 15 of the cathode ray tube so that the cathode ray beam, when it first appears, will be at one edge instead of in the middle of the cathode ray screen.

Now when gaps 44 and 45 break down, the direction of current flow thereacross is in a direction to charge sweep condenser 41 in a direction opposite to that of its initial charge. Hence, condenser 41 is first discharged and then charged in the opposite direction and the voltage across the sweep condenser is in the meantime applied to the sweep plates 15 of the cathode ray tube and is sweeping the cathode ray across the screen from one side to the other.

When condenser 41 becomes charged, in a direction opposite to and in excess of its initial charge, to a predetermined desired voltage a discharge circuit connected across condenser 41 breaks down. This circuit contains resistances 46 and 47 and the gap 48 and when this circuit starts to discharge sweep condenser 41, it is desirable that the cathode ray tube be immediately extinguished. This is brought about by restoring the negative bias of grid 13 by interrupting the voltage that caused a current flow from point 38 through the circuit containing elements 39, 40 and 26. That part of resistance 31 between point 38 and ground is arranged to be short circuited by a three electrode vacuum tube 49 having its plate connected to point 38 and its cathode connected to ground at point 34. This tube is normally biased to cut off by a negative grid bias voltage obtained from point 52 on the resistance potentiometer supplied by rectifier tubes 29 and 30 by charging grid capacitor 55. However, the break down of gap 48 causes tube 49 to fire thus cutting off the cathode ray beam of the oscillograph tube.

In order to thus control the grid of tube 49 in response to a discharge across gap 48 the grid is connected to a circuit 50 which is connected between a point 51 which may be the right-hand point of gap 48 and the grid of tube 49. Circuit 50 also contains a condenser 56 between point horizontal line represents zero or ground voltage. Voltages above the horizontal line are positive and those below are negative. $ab$ represents the voltage across sweep condenser 41, $a$ being the voltage on the left-hand terminal thereof as seen in Fig. 1, $pP$ represents the voltage across gap 48, $p$ representing the voltage at the left terminal of such gap. AB represents the voltage across resistances 31 and 32, A being the voltage at the left end of such resistance at point 37, Fig. 1. 0, I, II and III are time reference points for convenience in the explanation.

The steady state condition of the voltages $ab$ and $pP$ shown at the left of Fig. 2 opposite time reference III corresponds to the voltages existing across sweep condenser 41 and gap 48 prior to the occurrence of the ignition of the cathode ray tube. This voltage is also equal to the voltage existing between point 53 and 54 from which it is obtained.

It is a voltage below the break down voltage of gap 48 but is sufficient to hold the cathode ray beam to one edge of the cathode ray tube screen as soon as the cathode ray is established. At this time the condensers 27 and 28 are charged. At time 0 a signaling impulse sufficient to break down gap 35 occurs on the middle point of this gap in response to some surge phenomenon to be investigated. The charges on condensers 27 and 28 are released and these condensers discharge in series through the circuit formed by gap 35 and the resistances 31 and 32. Voltage oA occurs across resistance 31 and voltage oB across resistance 32. An impulse is sent through circuit 39, 40, 26 from point 38 on resistance 31 and the cathode ray beam is started from cathode 12. Gaps 44 and 45 also break down and a portion of the charge from condensers 27 and 28 is diverted through resistances 42 and 43. At time 0 the voltage oD also occurs between filament and plate of tube 49, this being the voltage between points 38 and 34, Fig. 1. However, this tube is held at cut-off by its negative grid bias.

The interval between times 0 and I is the interval during which the cathode ray tube is ignited and in operation to register whatever voltage phenomenon is impressed across its plates 36. During this interval the sweep condenser 41 is first discharged and then charged in the opposite direction. This is shown by the fact that the voltages $ab$ and $pP$ first reduce to zero and then rise in the opposite direction, the shaded portion of Fig. 2 representing the voltage on the right-hand terminal 58 of the sweep condenser which charges from a positive to a negative value. This reversal of voltage on the sweep condenser sweeps the cathode ray beam across the screen at a uniform rate. In the meantime the voltage AB and Do across resistances 31 and 32 and across tube 49, respectively, have decreased somewhat as the condensers 27 and 28 discharge. At time I gap 48 breaks down and the sweep condenser starts to discharge therethrough. The voltage across gap 48 instantaneously drops to a low value disturbing the voltage condition on condenser 56 in such a manner that a positive voltage impulse is conveyed to the grid of tube 49 and tube 49 fires and the voltage Do across it drops to practically a zero value causing point 38 to drop to practically ground potential. This returns the negative cut-off bias to control grid 13 of the cathode ray tube and the cathode ray is extinguished. Once started, tube 49 continues to pass current so long as current flows across gap 35 since now the discharge path of condensers 27 and 28 is through this tube. Between times I and II the condensers 27, 28 and 41 continue to discharge until the voltage across gap 35 is no longer able to maintain the arc and all gaps cease to pass current at time II. It is seen that had the cathode ray beam not been extinguished at time I the voltage across the sweep plates would have slowly returned the beam towards the center of the screen and the record would likely have been fogged. At time II the condensers 27 and 28 start to charge again. Condenser 41 is first discharged and recharged in the opposite direction and in a short time the apparatus is again ready for another operation at time III. The curves of Fig. 2 are not intended to be to scale but are intended to picture the general way in which the voltages vary at different times during the operation of the apparatus. The time 0—I may be varied between wide limits by varying the capacity of the sweep condenser.

For the purpose of giving one set of practicable values of the more important circuit elements but not by way of limiting my invention, the following may be used:

Charging potential of tubes 29 and 30 in series should give up to 15,000 volts.
Resistance 26_____ 50,000 ohms
Resistance 40_____ 1 megohm
Resistances 31 and 32____ 100,000 ohms each
Resistances 42 and 43____ 20,000 ohms each
Resistances 46 and 47_ 5,000 ohms each
Resistance between 37 and 38_____ 80,000 ohms
Condenser 39_____ 1,000 micromicrofarad
Condensers 27 and 28____ 0.5 microfarad
Condenser 41 variable between 0.0001 and 0.01 microfarad to obtain a time axis between 1 and 100 micro-seconds.
Gap 35 set above normal charging voltage of rectifiers 29 and 30.
Gaps 44 and 45 to hold 2,000 volts D. C.
Gap 48 to hold 2,000 volts D. C.

What I claim as new and desire to secure by Letters Patent of the United States is:

1. A cathode ray oscillograph having electrodes for producing a cathode ray beam, a screen, sweep plates for sweeping the beam across the screen and a control grid for controlling the ignition and extinction of the cathode ray beam, means for impressing a voltage across the sweep plates prior to the establishment of the beam for causing the beam to strike at one side of the screen when established, means for impressing a beam-igniting control voltage on said control grid to establish the cathode ray beam when a recording operation of the oscillograph is desired and, simultaneously with the establishment of such beam, to vary the voltage on the sweep plates so that the beam will be swept across the screen, and means responsive to the voltage across said sweep plates following such variation for removing the beam-igniting voltage from the control grid to extinguish the cathode ray beam.

2. In combination, a cathode ray oscillograph having a screen, sweep plates, a cathode, and a control grid for controlling the ignition and extinction of the cathode ray beam, an impulse generator, a discharge resistance therefor, means for discharging said generator when a recording operation of said oscillograph is desired, a circuit connecting said control grid to a point on said resistance, a sweep voltage condenser connected across said sweep plates, said condenser being initially charged sufficiently to remove the cathode ray beam to one side of the screen, said condenser being also connected across said resistance through a spark gap circuit which isolates the condenser from the resistance when there is no discharge therethrough but which becomes conducting to modify the charge on said condenser when a discharge occurs through said resistance, the connections of said control grid and condenser to said resistance being at such voltage points that the discharge of said impulse generator causes the ignition of the cathode ray beam of the oscillograph and causes the beam to be swept across said screen, and means responsive to the modified charge on said condenser following the sweeping of the beam across the screen for short-circuiting a portion of said resistance, thereby causing the cathode ray beam to be extinguished.

3. In combination, a cathode ray oscillograph having a screen, sweep plates, a cathode, and a grid for controlling the ignition and extinguishing of the cathode ray beam, a sweep voltage condenser connected across said sweep plates, means for providing an initial voltage charge in one direction on said condenser sufficient to move the cathode ray to one side of the screen, means responsive to phenomena to be recorded by said oscillograph for producing a beam-ignition voltage on said control grid and simultaneously charging the condenser in the opposite direction and to a voltage higher than the initial voltage thereon to cause the beam to be swept across the screen, and means which is non-responsive to the initial voltage on said condenser but responsive to said higher voltage for removing the beam-igniting voltage from said control grid to extinguish said cathode ray beam.

4. In combination with a cathode ray oscillograph having a cathode, sweep plates and a control grid, apparatus for controlling the voltages on said sweep plates and control grid comprising a pair of supply condensers, a resistance between one set of terminals of said condenser, a spark gap connected between the other set of terminals of said condenser, a direct current source connected across said spark gap for charging said condensers to a high voltage below the normal breakdown voltage of said spark gap, means for initiating a voltage breakdown and a discharge of said condensers across said said oscillograph is initiated when the supply condensers discharge, a grid-controlled vacuum tube normally biased to cut-off connected across a portion of said resistance and which, when fired abruptly, changes the voltage of said tap to extinguish the cathode ray beam, and means responsive to a predetermined charging of said sweep condenser through said other set of gaps for firing said vacuum tube.

5. In combination, a cathode ray oscillograph having a screen, a pair of sweep plates, a cathode and a control grid for controlling the ignition and extinction of the cathode ray beam in response to changes in the biasing voltage on said grid, a sweep condenser connected across said sweep plates, means for providing an initial charge on said condenser sufficient to cause the cathode ray beam to strike the screen at one edge thereof, means responsive to phenomena to be recorded by said oscillograph for producing a beam-initiating voltage on said control grid and simultaneously modifying the charge on said condenser so as to sweep the beam from one edge of the screen to the other, and means responsive to the voltage on said condenser after the beam has been swept across said screen for removing the beam-initiating voltage on said control grid to extinguish said cathode ray beam.

6. In combination, a cathode ray oscillograph having a screen, a cathode, sweep plates, and a control grid for initiating and extinguishing the cathode ray beam, control apparatus for said oscillograph comprising a direction current impulse generator, a discharge resistance for said generator, a circuit from said control grid to a point on said resistance for impressing a beam-initiating voltage on said control grid when said impulse generator discharges, means responsive to phenomena to be recorded for discharging said sistance and which, when fired, modifies the voltage distribution along said resistance to interrupt the beam-initiating voltage and causes the cathode ray beam to be extinguished, and means responsive to the voltage existing on said condenser when the beam has been swept across the screen for firing said vacuum tube.

7. In combination, a cathode ray oscillograph having a screen, sweep plates, a cathode, and a cathode ray initiating and extinguishing control grid, an impulse generator, a discharge resistance therefor, means for discharging said generator when a recording operation of said oscillograph is desired, a circuit connecting said control grid to a point on said resistance of such voltage that the cathode ray beam is initiated in response to the discharge of said generator, a sweep condenser connected across the sweep plates and initially charged sufficiently to cause the cathode ray beam to appear to one side of the screen, circuit connections from each side of said condenser to opposite ends of said discharge resistance, each such connection including a resistance and a spark gap, said gaps being set to break down and divert a portion of the charge from the impulse generator to said condenser when the impulse generator discharges, thereby so modifying the charge on the condenser as to sweep the beam across the screen and producing a voltage across said condenser in excess of its initial voltage, another gap in short-circuiting relation to said condenser set to break down only at such excess voltage and means responsive to the break down of said last-mentioned gap for removing the beam-initiating voltage from the control grid and extinguishing the cathode ray beam.

HANS P. KUEHNI.

---

CERTIFICATE OF CORRECTION.

Patent No. 2,180,153.　　　　　　　　　　November 14, 1939.

HANS P. KUEHNI.

It is hereby certified that error appears in the printed specification of the above numbered patent requiring correction as follows: Page 2, second column, line 43, for the word "point" read points; page 4, first column, line 45, claim 6, for "direction" read direct; and second column, line 6, same claim, after "gap" insert so; and that the said Letters Patent should be read with this correction therein that the same may conform to the record of the case in the Patent Office.

Signed and sealed this 6th day of February, A. D. 1940.

Henry Van Arsdale,
Acting Commissioner of Patents.

(Seal)

CERTIFICATE OF CORRECTION.

Patent No. 2,180,153.                                             November 14, 1939.

HANS P. KUEHNI,

It is hereby certified that error appears in the printed specification of the above numbered patent requiring correction as follows: Page 2, second column, line 43, for the word "point" read points; page 4, first column, line 45, claim 6, for "direction" read direct; and second column, line 6, same claim, after "gap" insert so; and that the said Letters Patent should be read with this correction therein that the same may conform to the record of the case in the Patent Office.

Signed and sealed this 6th day of February, A. D. 1940.

Henry Van Arsdale,
                                      Acting Commissioner of Patents.

(Seal)